United States Patent
Chakraborty

(10) Patent No.: US 10,389,456 B2
(45) Date of Patent: Aug. 20, 2019

(54) WAKE UP RECEIVER USING MULTIPHASE PEAK DETECTOR AND DEMODULATOR

(71) Applicant: Texas Instruments Incorporated, Dallas, TX (US)

(72) Inventor: Sudipto Chakraborty, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 193 days.

(21) Appl. No.: 15/248,604

(22) Filed: Aug. 26, 2016

(65) Prior Publication Data

US 2018/0062772 A1 Mar. 1, 2018

(51) Int. Cl.
| | |
|---|---|
| *H04B 17/29* | (2015.01) |
| *H04L 12/801* | (2013.01) |
| *H04W 24/08* | (2009.01) |
| *H04L 27/38* | (2006.01) |
| *H04L 27/34* | (2006.01) |

(52) U.S. Cl.
CPC ............ *H04B 17/29* (2015.01); *H04L 27/38* (2013.01); *H04L 47/29* (2013.01); *H04W 24/08* (2013.01); *H04L 27/34* (2013.01); *Y02D 70/00* (2018.01)

(58) Field of Classification Search
CPC ......... H04B 17/29; H04L 47/29; H04W 24/08
See application file for complete search history.

(56) References Cited

U.S. PATENT DOCUMENTS

| | | | |
|---|---|---|---|
| 7,031,409 B2 | 4/2006 | Brobston et al. | |
| 7,921,351 B2* | 4/2011 | Williams | H04L 1/0045 714/760 |
| 2002/0030871 A1 | 3/2002 | Anderson et al. | |
| 2003/0092412 A1* | 5/2003 | Wu | H03G 3/3052 455/234.1 |
| 2004/0062329 A1* | 4/2004 | Hsu | H04L 7/0338 375/355 |
| 2005/0058228 A1 | 3/2005 | Birkett | |
| 2007/0176682 A1 | 8/2007 | Nakamura | |
| 2008/0137777 A1* | 6/2008 | Behzad | H04L 27/362 375/319 |
| 2009/0286548 A1 | 11/2009 | Coronel et al. | |
| 2013/0101013 A1 | 4/2013 | Kim et al. | |
| 2014/0030996 A1 | 1/2014 | Gan et al. | |
| 2016/0072656 A1 | 3/2016 | Nilsson | |
| 2016/0077502 A1 | 3/2016 | Broker | |
| 2017/0187405 A1* | 6/2017 | Sen | H04B 1/1027 |

OTHER PUBLICATIONS

International Search Report and Written Opinion in PCT/US 2017/048929, dated Nov. 30, 2017 (6 pages).

* cited by examiner

*Primary Examiner* — Luat Phung
(74) *Attorney, Agent, or Firm* — Brian D. Graham; Charles A. Brill; Frank D. Cimino

(57) ABSTRACT

A wireless receiver is disclosed that includes a peak detector coupled to receive a plurality of phases of an input signal, said plurality being substantially in quadrature, and to provide a detector output and a demodulator comprising an analog comparator coupled to receive said detector output and to provide a comparator output.

21 Claims, 8 Drawing Sheets

WAKE UP RECEIVER USING MULTIPHASE PEAK DETECTOR AND DEMODULATOR

FIELD OF THE DISCLOSURE

Disclosed embodiments relate generally to the field of wake-up receivers. More particularly, and not by way of any limitation, the present disclosure is directed to a wake-up receiver using a multiphase peak detector and demodulator.

BACKGROUND

A wake-up receiver is an auxiliary receiver whose job is to continuously monitor for communication requests, while allowing a main receiver to remain in sleep mode until communication is desired. Low latency wireless communication is the key to success for low power wake up receivers. Low latency can be achieved by consuming significant amounts of power in the front-end electronics, but this reduces battery longevity or limits the signal processing if the application operates with wireless charging. Previous solutions for detecting a wake-up request have used a logarithmic amplifier to detect the signal at radio frequency (RF), pattern detection with a mixer followed by pseudo-differential stages with cascaded high-pass and low-pass frequency responses, and energy detection with respect to a single phase of the signal.

SUMMARY

Disclosed embodiments implement demodulators that operate using multiple phases of input signals, specifically, using quadrature phases of the signals. Typically, traditional ASK demodulators utilize either a single phase or differential phase signals. Use of N phases reduces the detection time by a factor of N by decreasing the settling time of a peak detector. Due to the inherent low ripple resulting from the N phases, the filtering elements also require low area on chip (i.e., the cut-off frequency of these filters becomes N times higher compared to a single peak detector) Additionally, distributed demodulators receive signals after each gain/filter stage. With each stage providing gain to the desired signal and filtering to the undesired signal over the previous stage, an output from one stage can be used as a threshold value to the output from the following stages, providing a threshold value that is automatically dependent on the signal amplitude, so that a precise reference voltage for the threshold value is not necessary. These improvements can be incorporated into an overall architecture for a low power wake-up receiver.

In one aspect, an embodiment of a wireless receiver is disclosed. The wireless receiver includes a peak detector coupled to receive a plurality of phases of an input signal and to provide a detector output, said plurality of phases being substantially in quadrature, and a demodulator comprising an analog comparator coupled to receive said detector output and to provide a comparator output.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As noted above, Applicant is disclosing a system that uses quadrature copies of an input signal to allow faster detection of a signal and a demodulator that does not require a precise threshold to be applied to determine the digital value of the signal. Embodiments of the overall system convert an input signal to quadrature signals prior to providing the input signal to the demodulator. As will be shown below, in one embodiment, two or more mixers mix the incoming differential signals with quadrature frequencies in order to provide quadrature signals to filtering stages, ensuring that processing is largely performed in quadrature. In another embodiment, the mixers and filter stages use differential signals and then convert the differential signals to quadrature signals using a passive asynchronous quadrature phase shifter prior to providing the signals to demodulators. We turn first to FIGS. 1-3 to discuss how these quadrature signals are used.

Figure 1:
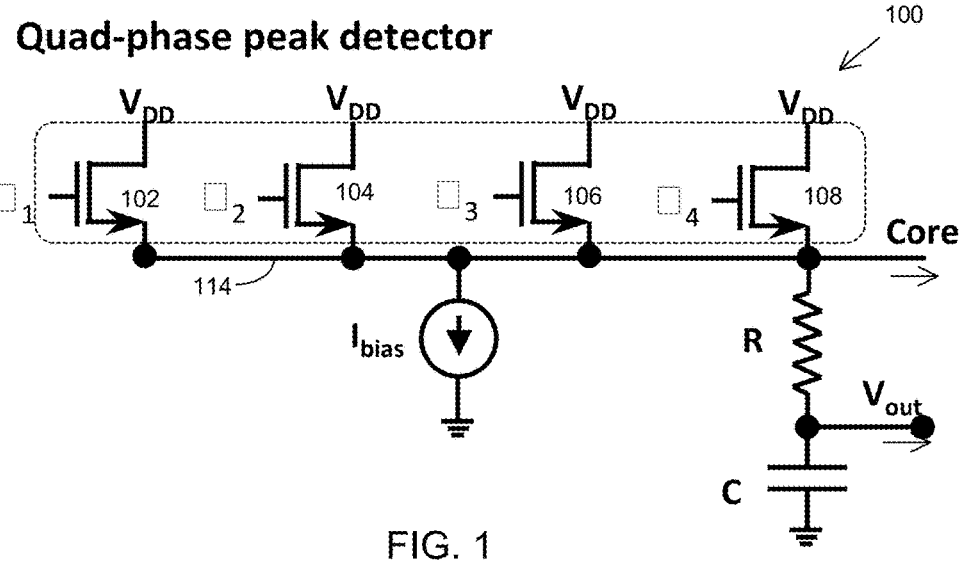
FIG. 1 depicts a circuit diagram of a quadrature phase peak detector according to an embodiment of the disclosure.

As is known and will be depicted below, a demodulator requires at least a comparator and a translator circuit that determines a digital value corresponding to the comparator output. A peak detector can be regarded as either a module that provides input to the demodulator or else an early stage of the demodulator, as these circuits can be closely linked with each other. FIG. 1 depicts a quadrature phase peak detector 100, which in at least one embodiment is considered part of the demodulator, according to an embodiment of the disclosure. In this figure, NMOS transistors 102, 104, 106, and 108 are coupled in parallel, with their respective drains coupled to $V_{DD}$ and their sources coupled to connector 114, which is also coupled to current sink $I_{BIAS}$. Resistor R has a first terminal coupled to connector 114 and a second terminal coupled to capacitor C, which has its other terminal coupled to local ground. $V_{OUT}$ can be taken between resistor R and capacitor C. Applicants note that although transistors 102, 104, 106, and 108 are noted to be NMOS transistors in this embodiment, they may also be implemented as PMOS transistors.

Figure 1A:
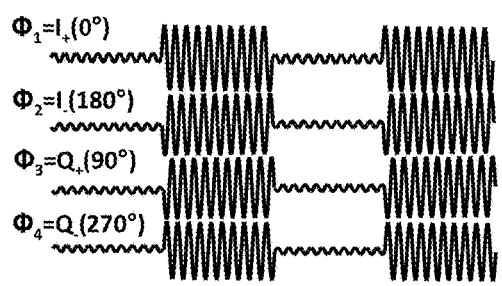
FIGS. 1A and 1B depict the input signals and the output signals respectively of the circuit of FIG. 1 according to an embodiment of the disclosure.
Figure 1B:
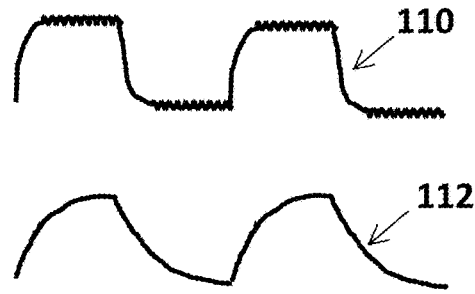

Each of transistors 102, 104, 106, 108 has its gate controlled by one of four quadrature signals, which are shown in FIG. 1A and which originate in the filtering stages of the receiver. These four signals include signal $\Phi_1$, which is identified as $I_+$ (0°), signal $\Phi_2$, identified as $I_-$ (180°), signal $\Phi_3$, identified as $Q_+$ (90°), and signal $\Phi_4$, identified as $Q_-$ (270°). The gate of transistor 102 is controlled by signal $\Phi_1$, while the gates of transistors 104, 106 and 108 are controlled respectively by signals $\Phi_2$, $\Phi_3$, and $\Phi_4$. Although not specifically shown in this figure, each of transistors 102, 104, 106, 108 is biased at close to its threshold voltage, i.e., gate-source voltage $V_{GS}$ is approximately equal to the threshold voltage $V_{TH}$. In operation, connector 114 provides signal 110 and $V_{OUT}$ provides signal 112, both of which are seen in FIG. 1B.

By controlling the gate of transistors 102, 104, 106, 108 with the quadrature signals and taking the output from the source, quadrature phase peak detector 100 provides high input impedance and low output impedance. Providing at least one low impedance point in the peak detector reduces a time constant associated with operation of the peak detector. The multiple phases of the input signal provide less ripple in the output signal. Consequently, in one embodiment, the signal settles in less than 500 microseconds with a robust scheme and good sensitivity and selectivity. Due to the low ripple or noise, a receiver using the disclosed peak detector may require less filter area and utilize a smaller capacitor than previously required. Applicant also notes that the multiple phases do not require a high degree of accuracy in the spread between signals, i.e., if instead of 0° and 90°, the signals are 0° and 95°, the effect on the results are negligible, so no calibration is needed.

Figure 2:
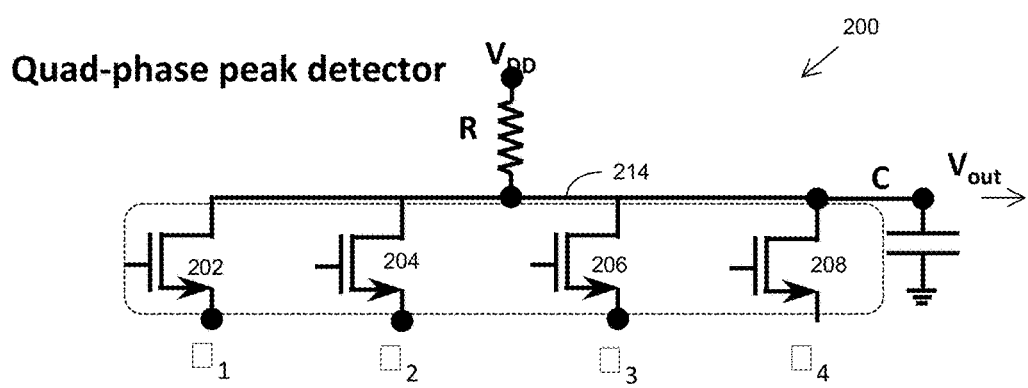
FIG. 2 depicts a circuit diagram of a quadrature phase peak detector according to an embodiment of the disclosure.
Figure 2A:
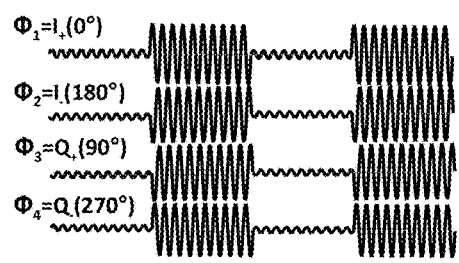
FIGS. 2A and 2B depict the input signals and the output signal respectively of the circuit of FIG. 2 according to an embodiment of the disclosure.
Figure 2B:

FIG. 2 depicts quadrature phase peak detector 200 according to an alternate embodiment of the disclosure. In this embodiment, NMOS transistors 202, 204, 206, 208 are again coupled in parallel, although in this embodiment, the quadrature signals $\Phi_1$, $\Phi_2$, $\Phi_3$, and $\Phi_4$ (shown again in FIG. 2A) are applied to the source terminals of transistors 202, 204, 206, 208 respectively. The drain terminals of these four transistors are each coupled to connector 214, which in turn is coupled to the upper rail through resistor R. Capacitor C has a first terminal coupled to connector 214 and a second terminal coupled to local ground. $V_{OUT}$ is taken from connector 214 and provides output signal 212, shown in FIG. 2B. As in the previous embodiment, each of transistors 102, 104, 106, 108 is biased at close to its threshold voltage (not specifically shown).

Quadrature phase peak detector 200 exhibits current mode input with low input impedance and voltage mode output with high output impedance. As previously mentioned, providing at least one low impedance point in the analog detector reduces the time constant associated with operation of the peak detector. As in the previous examples, transistors 202, 204, 206, 208 are not limited to NMOS transistors, but may also be PMOS transistors. This embodiment shares the advantages of quadrature phase peak detector 100, i.e., low ripple, and settles in less than 500 microseconds, a latency that is related to the period of the signal applied to the peak detector. In both of these embodiments, the use of N phases artificially creates an apparent frequency of $N*F_C$, where $F_C$ is the frequency of the input signal. Given the lower ripple, filtering components may be smaller or in some embodiments may be eliminated to save area. This concept can easily be extended into eight or more phases, as will be discussed below. In such an embodiment, quadrature phase peak detectors 100, 200 will each include N transistors corresponding to the N phases.

Figure 3A:
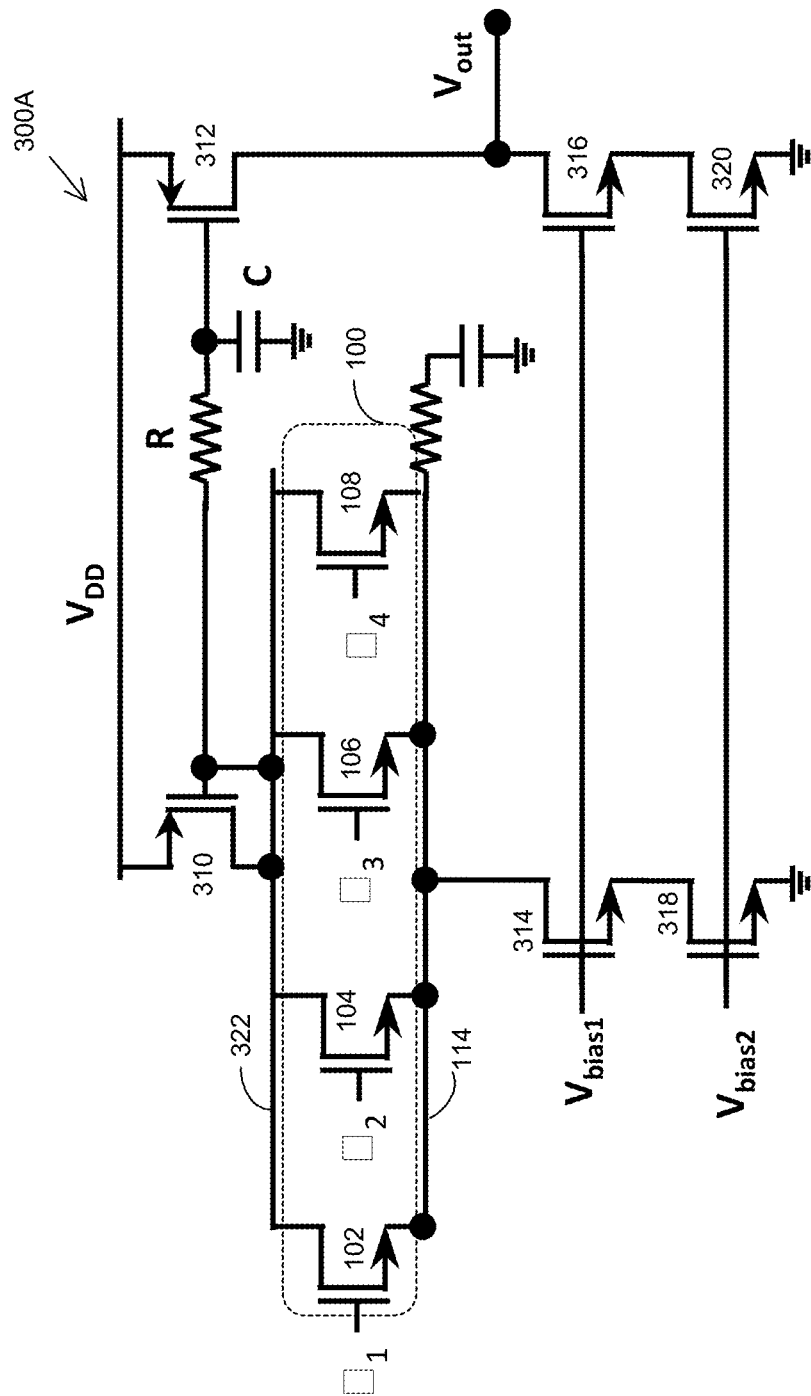
FIG. 3A depicts a circuit diagram of a current comparator used with a quadrature phase peak detector according to an embodiment of the disclosure.

FIG. 3A discloses a current comparator 300A according to an embodiment of the disclosure. Current comparator 300A incorporates quadrature phase peak detector 100 containing transistors 102, 104, 106, 108, each receiving one of quadrature signals $\Phi_1$, $\Phi_2$, $\Phi_3$, and $\Phi_4$ on a respective gate terminal, and also includes transistors 310, 312, 314, 316, 318, 320. The source of PMOS transistor 312 is coupled to the upper rail and the drain is coupled in series with NMOS transistors 316 and 320 to ground. PMOS transistor 310 has its source coupled to the upper rail and both its gate and drain coupled to drain connector 322 of peak detector 100 and NMOS transistors 314 and 318 are coupled in series between source connector 114 of peak detector 100 and the lower rail. The gates of PMOS transistors 310 and 312 are coupled together, with resistor R and one terminal of capacitor C coupled between the two transistors; a second terminal of capacitor C is coupled to the lower rail. NMOS transistors 314 and 316 have gates coupled to input $V_{BIAS1}$ and NMOS transistors 318 and 320 have gates coupled to input $V_{BIAS2}$. These input bias values define operating conditions for the associated transistors and provide a low voltage value that overcomes the threshold value of the respective transistors and allows more efficient operation. Together, transistors 310, 312, 314, 316, 318, and 320 form a current mirror such that PMOS transistor 312 mirrors the drain current from peak detector 100 and NMOS transistors 316, 320 mirror the source current from peak detector 100. Output signal $V_{OUT}$ reflects a difference between the two drain currents of transistors 312 and 316 that is proportional to the envelope of the input signal.

Figure 3B:
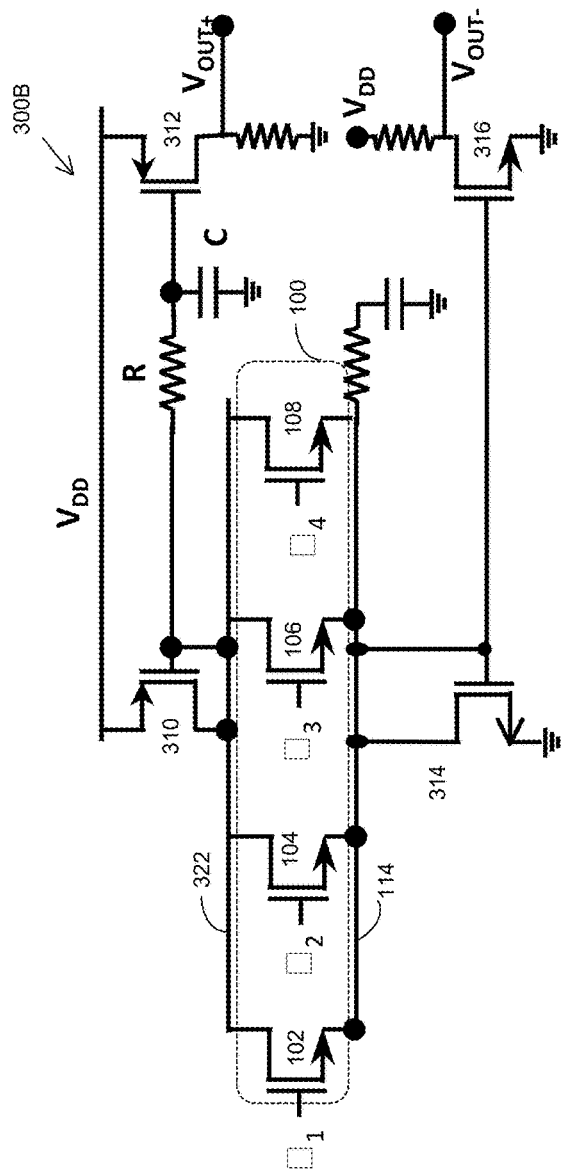
FIG. 3B depicts the circuit of FIG. 3A modified to provide differential outputs according to an embodiment of the disclosure.
Figure 3C:
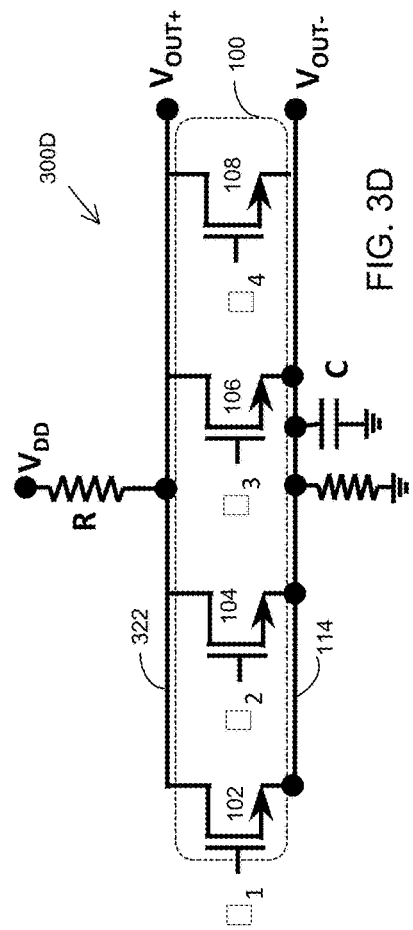
FIG. 3C depicts the differential outputs of the circuit of FIG. 3B according to an embodiment of the disclosure.
Figure 3D:
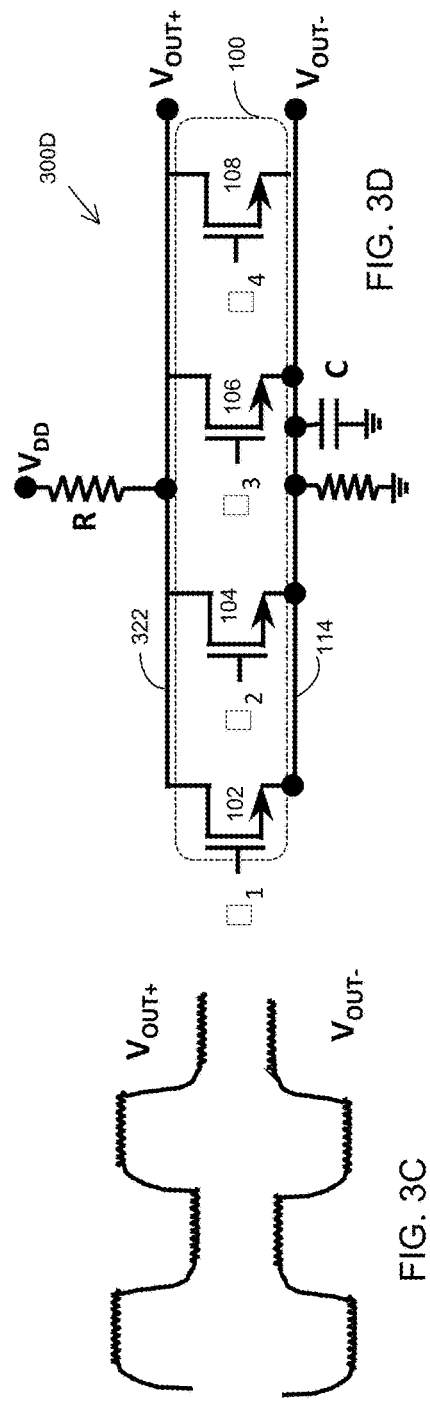
FIG. 3D depicts an alternate version of the circuit that provides differential outputs according to an embodiment of the disclosure.

FIG. 3B discloses a current comparator 300B, which provides differential outputs according to an embodiment of the disclosure. The upper portion of the circuit for comparator 300B is the same as for comparator 300A, except that PMOS transistor 312 has its source connected to ground, with $V_{OUT+}$ being taken between the drain of transistor 312 and ground. Below peak detector 100, NMOS transistors 314, 316 have their gates tied together and also tied to connector 114 to create a separate current mirror. $V_{OUT-}$ is taken between the drain of NMOS transistor 316 and the lower rail. FIG. 3C illustrates the output of comparator 300B, which are differential signals. FIG. 3D discloses an alternate version of the current comparator of FIG. 3B in which a current mirror is not used. In this embodiment, peak detector 100 is connected to the upper rail through a first resistor and is connected to the lower rail through both a second resistor and a capacitor connected in parallel. In this embodiment, $V_{OUT+}$ is taken directly from drain connector 322 and $V_{OUT-}$ is taken directly from source connector 114.

Figure 4:
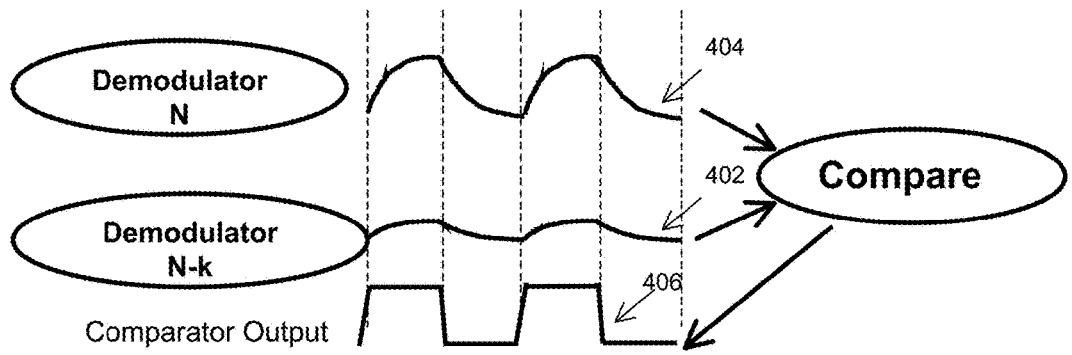
FIG. 4 depicts the way in which example output signals from two successive stages of peak detectors can be used to provide a digital output according to an embodiment of the disclosure.

FIG. 4 depicts a voltage mode comparator scheme that does not require a precise threshold to be set. When converting a signal from analog to digital, precise threshold values are generally generated on-chip from well-known references such as bandgap etc., to provide a an average value to slice logic 1 and 0 levels. Setting the reference level equal to the average value leads to maximum noise margin in the 0 and 1 states. In an example system in which signal values can vary between zero and three volts, the threshold would generally be set at 1.5 volts. The present architectures for a wake-up receiver use a distributed set of N analog demodulators in which each successive demodulator is coupled to receive the output from successive gain/filter modules. The output signal of each N-phase demodulator is proportional to the input signal amplitude, and all demodulators use the same input DC voltage, which is typically set at mid-rail. All of this means that input to demodulator N and demodulator N+k, (where k>=1) are simply scaled versions of each other and these two values can be put to a simple comparator, with the smaller value being used as a threshold value for the larger value, to provide rail to rail output voltage. In FIG. 4, the output signal from two successive demodulators is shown. Signal 402 is produced by a first demodulator N and signal 404 is produced by a successive demodulator N+k, whose signal has undergone further gain and filtering and consequently has a larger swing in the signal. By using signal 402 as a threshold for signal 404, there is no need to generate a precise on-chip threshold. Instead, each demodulator provides an output that can be used as a threshold signal in a comparator associated with a successive demodulator output. The detector output of an $N^{th}$ peak detector can also be compared to a linear combination of comparator outputs from a number of previous stages. In one embodiment, a linear combination of previous comparator outputs is determined using the formula, $D_{O,N}=V_{PD(N)}-V_{PD(N-k)}$ where $D_{O,N}$ denotes the comparator output of an $N^{th}$ stage, k is an integer less than N, and $V_{PD,N}$ denotes a detector output of an $N^{th}$ stage. It will be understood that a final output value is taken from the final demodulator stage and used to provide signal 406; earlier demodulators are used primarily to provide this threshold value to successive demodulators.

Figure 5A:
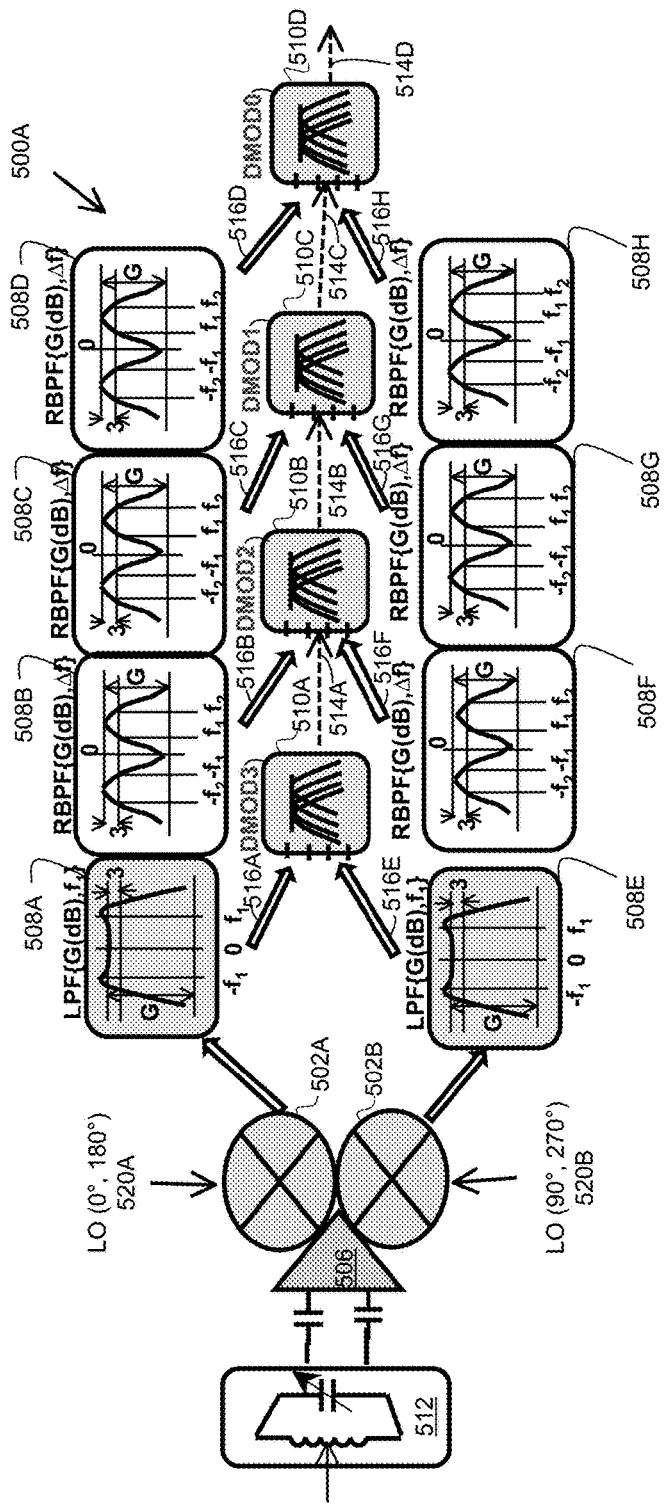
FIG. 5A depicts a block diagram of a low power wake-up receiver according to an embodiment of the disclosure.

Referring now to FIG. 5A, a block diagram of a low power wake-up receiver 500A is shown. Wake-up receiver 500A uses a multi-phase ASK demodulator that employs the disclosed quadrature phase peak detector and also uses the output of an earlier demodulator as a threshold for a later demodulator. Signal processing is performed using synchronous quadrature phases and the mixers operate with quadrature switching waveforms that are precisely generated using frequency dividers inside the phase locked loop. Wake-up receiver 500 receives differential signals from antenna 512. These differential signals are received and amplified at amplifier 506 and passed to mixers 502A and 502B. Mixer 502A mixes the differential signals with 0° and 180° signals from a first local oscillator 520A and mixer 502B mixes the differential signals with 90° and 270° signals from a second local oscillator 520B to create two sets of differential signals that are in quadrature.

The differential signals from mixer 502A are passed successively to gain/filter stages 508A, 508B, 508C, and 508D while the quadrature signals from mixer 502B are passed successively to gain/filter stages 508E, 508F, 508G, and 508H. Each successive gain/filter stage 508 provides both filtering, e.g. to remove blocker signals, and additional gain to the signals passed there through. Gain/filter stages 508A and 508E are baseband gain/filter stages with precise gain; gain/filter stage 508A is followed by passive polyphase gain/filter stages 508B, 508C, 508D and gain/filter stage 508E is followed by stages 508F, 508G, 508H. The two baseband filter stages 508A, 508E are each used to suppress the carrier signal and each of polyphase gain/filter stages 508B, 508C, 508D 508F, 508G, 508H can be used to provide a null for a blocker signal. The entire architecture is fully differential up to the demodulator stage and provides high immunity to common mode noise.

Figure 5B:
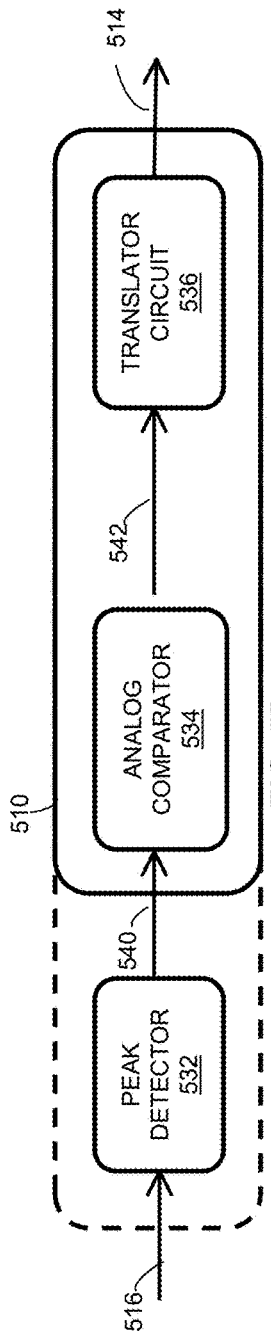
FIG. 5B depicts a block diagram of a demodulator according to an embodiment of the disclosure.

Gain/filter stages 508A and 508E are coupled to provide quadrature inputs to demodulator 510A; gain/filter stages 508B and 508F are coupled to provide quadrature inputs to demodulator 510B; gain/filter stages 508C and 508G are coupled to provide quadrature inputs to demodulator 510C; and gain/filter stages 508D and 508H are coupled to provide quadrature inputs to demodulator 510D. In the block diagram shown in this figure, the peak detector is not specifically shown, but can be considered a part of the demodulator. This is illustrated in FIG. 5B, which provides a block diagram of demodulator 510 as shown in FIG. 5A. In this figure, it can be seen that demodulator 510 includes peak detector 532, which receives quadrature input signals 516 and provides detector output signal(s) 540 to analog comparator 534. Analog comparator 534 in turn provides signal 542 to translator circuit 536 and translator circuit 536 determines whether the signal 542 should be considered a zero or a one and provides digital output signal 514. Since the analog detector in the disclosed embodiment is operating with four phases and detection leads to four times faster detection compared to single phase operation. Also, the output of demodulator 510 is a stable square waveform compared to a threshold based scheme providing pulse outputs. This also adds to the benefit of the low latency scheme, which simplifies the digital demodulator back end. An output signal from each demodulator may be provided to a successive demodulator in the string of demodulators, i.e., demodulator 510A may provide output signal 514A to demodulator 5106; demodulator 5106 may provide output signal 514B to demodulator 510C; and demodulator 510C may provide output signal 514C to demodulator 510D. In each of these instances, the output signal from one stage may be used as a threshold value for a subsequent stage. Further, outputs from two or more preceding stages may be combined together to provide a threshold value for a current stage. It will be understood that although four gain/filter stages are shown in these figures, there may be fewer or more gain/filter stages without departing from the spirit of the disclosure. Output signal 514D from demodulator 510D will be used to provide an output value for the circuit.

Figure 6:
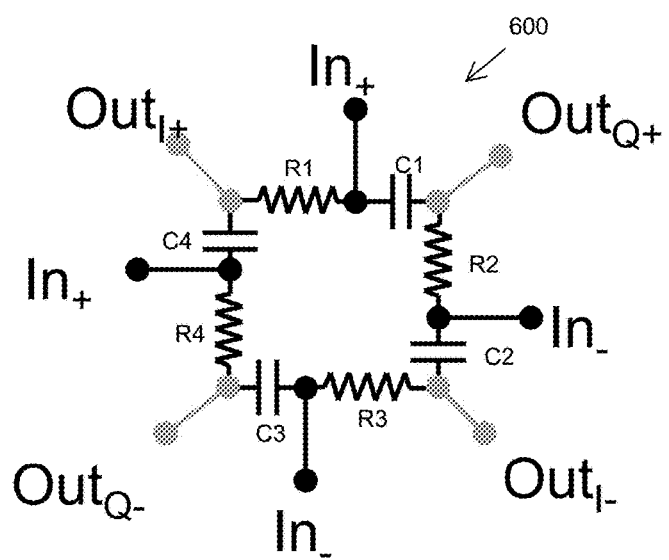
FIG. 6 depicts a circuit diagram of a passive asynchronous quadrature phase shifter according to an embodiment of the disclosure.
Figure 5C:
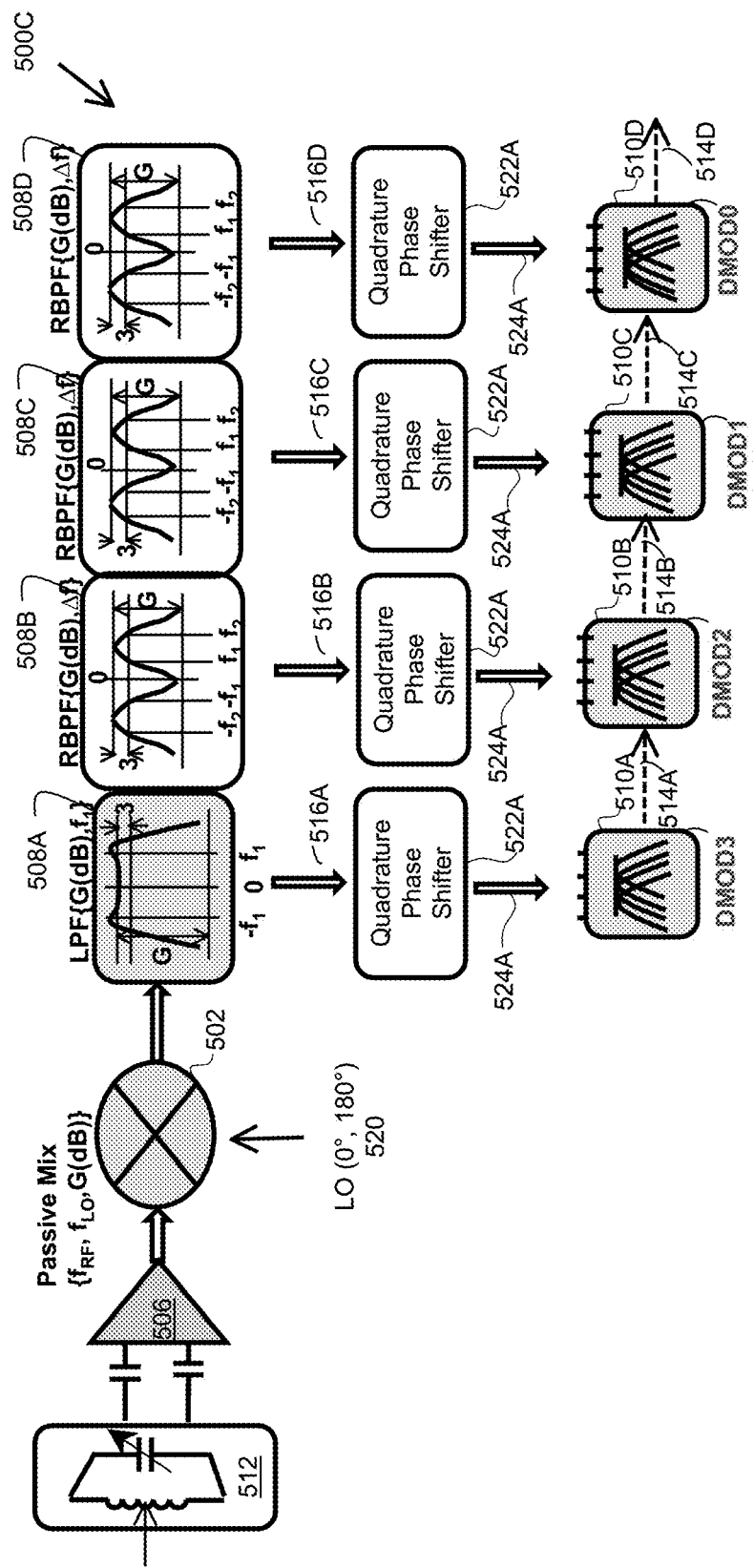
FIG. 5C depicts a block diagram of a low power wake-up receiver according to an embodiment of the disclosure.

Applicant notes that the architecture shown in FIG. 5A can also be modified so that a single mixer is used prior to the gain/filter stages and the differential signals provided by the single mixer pass through a single set of gain/filter stages. Such an embodiment is depicted in FIG. 5C. In this figure, amplifier 506 receives differential signals from antenna 512 and provides an amplified signal to mixer 502, which mixes the differential input signals with 0° and 180° differential signals from local oscillator 520, then provides differential signals to gain/filter stages 508A, 508B, 508C, 508D. The differential output signals from each gain/filter stage are sent not only to a successive gain/filter stage, but also to a respective quadrature phase shifter 522A, 522B, 522C, and 522D. Quadrature phase shifters 522A, 522B, 522C, and 522D are passive asynchronous quadrature phase shifters, an embodiment of which is depicted in FIG. 6 and discussed below. Quadrature phase shifter 600 operates as a low loss, all-pass filter (i.e., no filtering is performed) but a phase shift is performed so that the differential inputs $IN_+$ and $IN_-$ become quadrature outputs $OUT_{I+}$, $OUT_{I-}$, $OUT_{Q+}$, and $OUT_{Q-}$. It is these quadrature outputs 524A, 524B, 524C, 524D that are provided as input to demodulators 510A, 510B, 510C, 510D. As discussed previously, an output signal from each demodulator may be provided to a successive demodulator in the string of demodulators, i.e., demodulator 510A may provide output signal 514A to demodulator 510B; demodulator 510B may provide output signal 514B to demodulator 510C; and demodulator 510C may provide output signal 514C to demodulator 510D. The output signal from one stage may be used as a threshold value for a subsequent stage or combined with the output of additional stages to provide a threshold value for a current stage. Again, output signal 514D from demodulator 510D will be used to provide an output value for the circuit. Applicant notes that in the circuits described in FIGS. 5A-5C, all elements are DC compatible, i.e. the elements are coupled to each other without needing capacitors between the elements.

FIG. 6 depicts passive asynchronous quadrature phase shifter 600 according to an embodiment of the disclosure. Quadrature phase shifter 600 forms a closed loop that includes resistors R1, R2, R3, R4 and capacitors C1, C2, C3, C4. Capacitor C1 is coupled between resistors R1 and R2; capacitor C2 is coupled between resistors R2 and R3; capacitor C3 is coupled between resistors R3 and R4; and capacitor C4 is coupled between resistors R4 and R1. Differential signal $IN_+$ and $IN_-$ are input to quadrature phase shifter 600, with input signal $IN_+$ being coupled between R1 and C1 and also being coupled between R4 and C4. Similarly, input signal $IN_-$ is coupled between R2 and C2 and also between R3 and C3. Quadrature output signals $OUT_{I+}$ and $OUT_{I-}$ are taken between R1 and C4 and between R3 and C2 respectively; similarly, $OUT_{Q+}$, $OUT_{Q-}$ are taken between R2 and C1 and between R4 and C3 respectively. As described above, a copy of quadrature phase shifter 600 can be provided between each gain/filter stage and a respective demodulator.

In one embodiment of FIG. 5C, quadrature phase shifters 522 are mixer-based, rather than based on the cyclic arrangement of resistors and capacitors of FIG. 6. Although not specifically shown, such an embodiment, would utilize an arrangement similar to that shown by mixers 502A, 502B and local oscillators 520A, 520B. When used as quadrature phase shifters, this mixer/oscillator approach would be configured to up-convert each of differential phase signals 516A, 516B, 516C, 516D using quadrature phase clocks to generate four different phases $OUT_{I+}$, $OUT_{I-}$, $OUT_{Q+}$, $OUT_{Q-}$. This arrangement leads to a lower area requirement than the embodiment of FIG. 6 in that mixers use transistors, which are small, rather than the larger resistors and capacitors required by the .resistor/capacitor embodiment.

Figure 7A:
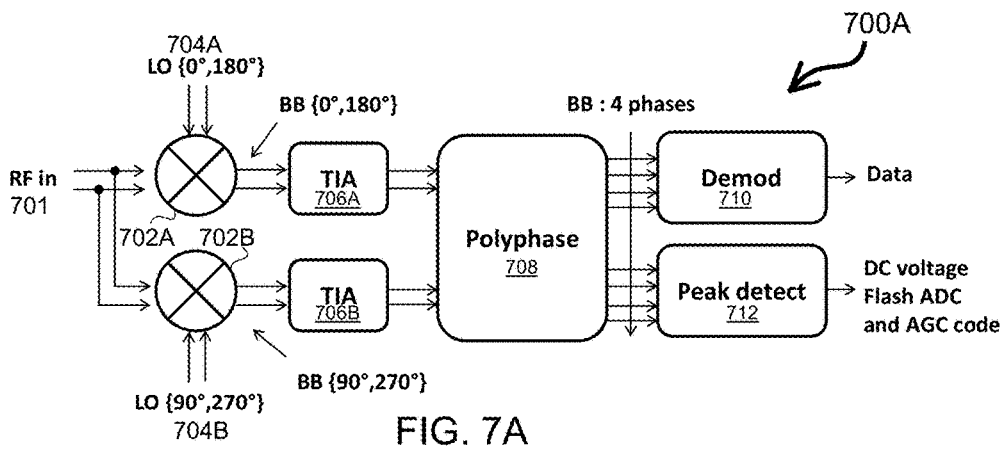
FIG. 7A depicts a block diagram of a low power wake-up receiver according to an embodiment of the disclosure.
Figure 7B:
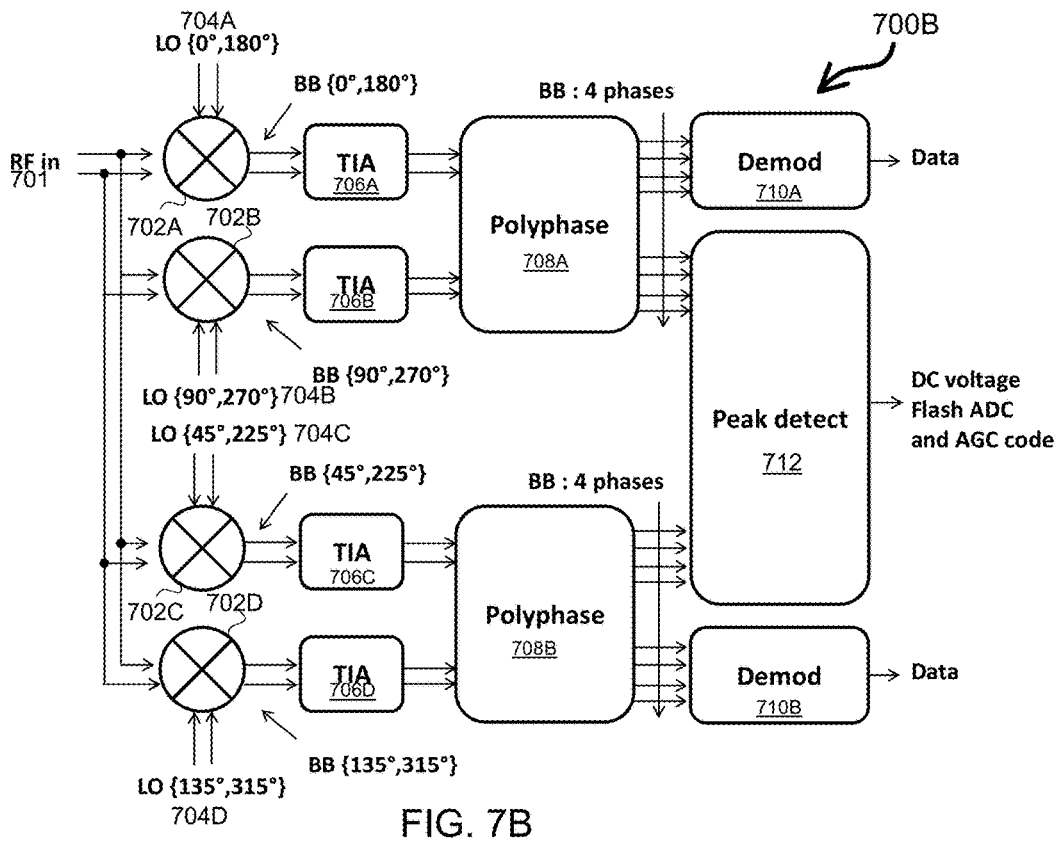
FIG. 7B depicts a block diagram of a low power wake-up receiver according to an embodiment of the disclosure.

FIG. 7A discloses another block diagram of a low power wake-up receiver 700A. In this figure, mixers 702 receive differential radio frequency input signal 701. Mixer 702A mixes 0° and 180° signals from local oscillator 704A with RF signal 701, and mixer 702B mixes 90° and 270° signals from local oscillator 704B with RF signal 701. The output from mixers 702A, 702B is provided to trans-impedance amplifiers 706A and 706B, where amplification of the signal is performed, and then to polyphase filter 708 where filtering is performed to remove, for example, blocker frequencies. Polyphase filter 708 then provides the amplified, filtered quadrature signals to both demodulator 710 and peak detector 712. Although not specifically shown in this figure, the output from peak detector 712 will also be provided to demodulator 710. This embodiment shares similarities with FIG. 5A and for that reason is not extensively discussed. This embodiment is primarily provided to illustrate how this architecture can be used to support further improvement in the speed of peak detection, as shown in FIG. 7B, which further improves the speed of peak detection by providing an additional phase shift of 45 degrees. This is done by using a broadband frequency divider that provides all the 45° phases to the mixers. Using the additional 45° granularity, this embodiment can obtain an eight times speed improvement of the peak detection time over single-phase operation, thereby greatly improving the energy consumption of the system.

Wake-up receiver 700B in FIG. 7B is essentially a doubled version of the circuit of FIG. 7A, with mixer 702A mixing 0° and 180° signals from local oscillator 704A with RF signal 701; mixer 702B mixing 90° and 270° signals from local oscillator 704B with RF signal 701; mixer 702C mixing 45° and 225° signals from local oscillator 704C with RF signal 701; and mixer 702D mixing 135° and 315° signals from local oscillator 704D with RF signal 701. The output from mixers 702A, 702B, 702C and 702D is provided respectively to trans-impedance amplifiers 706A, 706B, 706C and 706D and then to polyphase filters 708A and 708B respectively. Polyphase filter 708A then provides the quadrature signals to both demodulator 710A and peak detector 712, while polyphase phase-filter 708B provides the quadrature signals to demodulator 710B and peak detector 712. It will be understood that additional granularity in phase can also be added using further similar hardware blocks providing simultaneous signal processing.

Applicants have disclosed wireless receiver architectures that use quadrature phases of the input signal to provide faster signal recognition while using low power and can also use threshold values that are generated internally, rather than being provided by an outside source. Advantages of the disclosed architectures may include one or more of the following:

A mixer-first approach leads to signal processing at low power, reducing power consumption;

The input impedance of the receiver can be very large without a noise penalty, leading to low power consumption;

The front-end gain of the receiver architecture leads to a reduction of noise from subsequent stages; thereby large resistance values can be used to lower area and power consumption;

After down-conversion, N phases at an intermediate frequency (IF) are applied to the peak-detector, leading to a N times speedup in detection time;

More precision and faster detection can be obtained by making the gain of these stages accurate; at subthreshold region $g_m \propto 1/R_{VHSR}$ leads to a very precise realization of gain; The peak detector can also be linearized in order to improve linear detection range;

More detection speed (lower latency) can be achieved by adding similar hardware in parallel paths with more phase granularity The entire system is fully on-chip, and can use self-calibration for robust operation;

The disclosed embodiments are fully integrated, with low power and low area;

Largely process insensitive by using multiple sections of polyphase signal, and using signal dependent thresholds for comparison.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An integrated circuit comprising:
 a peak detector comprising a first transistor, a second transistor, a third transistor, and a fourth transistor, the peak detector configured to:
  receive a first quadrature signal, a second quadrature signal, a third quadrature signal, and a fourth quadrature signal of an input signal; and
  generate, by the first transistor, the second transistor, the third transistor, and the fourth transistor, a peak detector output signal based on the first quadrature signal, the second quadrature signal, the third quadrature signal, and the fourth quadrature signal; and
 a current mirror coupled to the peak detector that includes:
  a fifth transistor having a source coupled to a voltage source, a drain coupled to the first transistor, the second transistor, the third transistor, and the fourth transistor, and a gate coupled to the to the first transistor, the second transistor, the third transistor, and the fourth transistor; and
  a sixth transistor having a source coupled to the voltage source, a drain coupled to an output node, and a gate coupled to the gate of the fifth transistor by a resistor and coupled to a ground node by a capacitor.

2. The integrated circuit of claim 1, wherein the first quadrature signal is coupled to the first transistor, the second quadrature signal is coupled to the second transistor, the third quadrature signal is coupled to the third transistor, and the fourth quadrature signal is coupled to the fourth transistor.

3. The integrated circuit of claim 2, further comprising:
 an analog comparator coupled to the peak detector, the analog comparator configured to generate a comparator output based on the peak detector output signal; and
 a translator circuit coupled to the analog comparator, the translator circuit configured to generate a digital output signal based on the comparator output using an internally generated signal as a threshold value.

4. The integrated circuit of claim 1, wherein the peak detector output signal is a single peak detector output.

5. The integrated circuit of claim 3 wherein the translator circuit is configured to generate the digital output signal using a value from a comparator associated with at least one gain/filter stage as a threshold value.

6. The integrated circuit of claim 1, wherein the peak detector output signal comprises a differential peak detector output.

7. The integrated circuit of claim 1, further comprising:
 a first mixer configured to mix differential signals received from an antenna with first differential signals from a first local oscillator, to generate first mixer output signals;
 a first plurality of gain/filter stages connected in series to receive the first mixer output signals, each of the first plurality of gain/filter stages providing a gain/filter output signal to a successive gain/filter stage;
 a second mixer configured to mix the differential signals received from the antenna with second differential signals from a second local oscillator, to generate second mixer output signals, wherein the first mixer output signals and the second mixer output signals are in quadrature; and
 a second plurality of gain/filter stages connected in series to receive the second mixer output signals, each of the second plurality of gain/filter stages providing a gain/filter output signal to a successive gain/filter stage.

8. The integrated circuit of claim 7, wherein the peak detector is one of a plurality of peak detectors, and a first gain/filter stage of the first plurality of gain/filter stages and a second gain/filter stage of the second plurality of gain/filter stages provide gain/filter output signals to the peak detectors, wherein gain from each of the gain/filter stages is lower than a linear dynamic range of a respective peak detector.

9. The integrated circuit of claim 8, wherein the plurality of peak detectors, the first mixer, the second mixer, the first plurality of gain/filter stages, and the second plurality of gain/filter stages are DC compatible.

10. The integrated circuit of claim 8, wherein a final demodulation is performed by comparing a detector output of an $N^{th}$ peak detector of the peak detectors and a detector output of an $(N-k)^{th}$ peak detector of the peak detectors, wherein N is an integer and k is an integer greater than or equal to 1.

11. The integrated circuit of claim 8, wherein a final demodulation is performed by comparing a detector output of an $N^{th}$ peak detector and a linear combination of comparator outputs from a plurality of previous stages, using a formula, $D_{O,N}=V_{PD(N)}-V_{PD(N-k)}$, wherein $D_{O,N}$ is a comparator output of an $N^{th}$ stage, k is an integer less than N, and $V_{PD,N}$ is the detector output of the $N^{th}$ stage.

12. A wireless receiver comprising:
 a peak detector comprising a first transistor, a second transistor, a third transistor, and a fourth transistor, the peak detector configured to:
  receive a first quadrature signal, a second quadrature signal, a third quadrature signal, and a fourth quadrature signal of an input signal; and
  generate, by the first transistor, the second transistor, the third transistor, and the fourth transistor, a peak detector output signal based on the first quadrature signal, the second quadrature signal, the third quadrature signal, and the fourth quadrature signal;

a mixer configured to receive differential signals from an antenna and mix the differential signals from the antenna with differential signals from a local oscillator, to generate a mixer output signal;

a plurality of gain/filter stages coupled in series to receive the mixer output signal and to provide a gain/filter output to a successive gain/filter stage, generating a plurality of gain/filter outputs; and a plurality of quadrature phase shifters, configured to receive the plurality of gain/filter outputs and to produce a plurality of phase shifter output signals in quadrature.

13. The wireless receiver of claim 12, wherein the peak detector is one of a plurality of peak detectors and the plurality of phase shifter output signals is provided to the plurality of peak detectors.

14. The wireless receiver of claim 13, wherein phase shifters of the plurality of quadrature phase shifters comprise a cyclic arrangement of resistors and capacitors that generates the plurality of phase shifter output signals and retains DC common mode levels from the plurality of gain/filter outputs to the plurality of phase shifter output signals.

15. The wireless receiver of claim 12, wherein phase shifters of the plurality of quadrature phase shifters comprise an arrangement of up-converting mixers.

16. The wireless receiver of claim 14, wherein the plurality of quadrature phase shifters consume substantially no power and require no process trimming.

17. The wireless receiver of claim 12, wherein the peak detector, the mixer, the plurality of gain/filter stages, and the plurality of quadrature phase shifters are DC compatible.

18. The wireless receiver of claim 12, wherein a final demodulation is performed by comparing a detector output of an $N^{th}$ peak detector and a detector output of an $(N-k)^{th}$ peak detector, wherein N is an integer and k is an integer greater than or equal to 1.

19. An integrated circuit comprising:

a peak detector comprising a first transistor, a second transistor, a third transistor, and a fourth transistor, the peak detector configured to generate, by the first transistor, the second transistor, the third transistor, and the fourth transistor, a peak detector output signal based on a first quadrature signal, a second quadrature signal, a third quadrature signal, and a fourth quadrature signal;

a fifth transistor having a source coupled to a voltage source, a drain coupled to a drain of each of: the first transistor, the second transistor, the third transistor, and the fourth transistor, and a gate coupled to the drain of each of: the first transistor, the second transistor, the third transistor, and the fourth transistor; and a sixth transistor having a source coupled to the voltage source, a drain coupled to an output node, and a gate coupled to the gate of the fifth transistor.

20. The integrated circuit of claim 19, wherein the output node is a first differential output node, the integrated circuit further comprising:

a seventh transistor having a source coupled to a ground node, a drain coupled to a source of each of: the first transistor, the second transistor, the third transistor, and the fourth transistor, and a gate coupled to the source of each of: the first transistor, the second transistor, the third transistor, and the fourth transistor; and an eighth transistor having a source coupled to the ground node, a drain coupled to a second differential output node, and a gate coupled to the gate of the seventh transistor.

21. The integrated circuit of claim 1, wherein the current mirror further includes:

a seventh transistor having a source, a drain coupled to the first transistor, the second transistor, the third transistor, and the fourth transistor, and a gate coupled to a first bias voltage;

an eighth transistor having a source, a drain coupled to the output node, and a gate coupled to the first bias voltage;

a ninth transistor having a source coupled to the ground node, a drain coupled to the source of the seventh transistor, and a gate coupled to a second bias voltage; and a tenth transistor having a source coupled to the ground node, a drain coupled to the source of the eighth transistor, and a gate coupled to the second bias voltage.

* * * * *